(12) United States Patent
Sorkin

(10) Patent No.: US 6,764,105 B1
(45) Date of Patent: Jul. 20, 2004

(54) DUCT COUPLER APPARATUS FOR USE WITH PRECAST CONCRETE SEGMENTAL CONSTRUCTION

(76) Inventor: Felix L. Sorkin, 13022 Trinity Dr., Stafford, TX (US) 77477

(*) Notice: Subject to any disclaimer, the term of this patent is extended or adjusted under 35 U.S.C. 154(b) by 0 days.

(21) Appl. No.: 10/139,134

(22) Filed: May 7, 2002

(51) Int. Cl.[7] ............................................. F16L 49/00
(52) U.S. Cl. .................... 285/230; 285/903; 52/223.13
(58) Field of Search .......................... 285/290.1, 290.2, 285/230, 364, 414, 415, 903; 52/740.1, 585.1, 223.13, 704

(56) References Cited

U.S. PATENT DOCUMENTS

| | | | | |
|---|---|---|---|---|
| 768,228 A | * | 8/1904 | Hurst ........................... | 285/364 |
| 1,988,694 A | * | 1/1935 | Mallay ......................... | 285/414 |
| 2,342,422 A | * | 2/1944 | Morehead et al. ........... | 285/364 |
| 3,867,804 A | * | 2/1975 | Wilson ......................... | 52/704 |
| 4,773,198 A | * | 9/1988 | Reinhardt .................. | 52/223.13 |
| 4,799,307 A | * | 1/1989 | Reigstad et al. .......... | 52/223.13 |
| 4,900,193 A | * | 2/1990 | MacKinnon ............. | 52/223.13 |
| 5,345,742 A | * | 9/1994 | Rogowsky et al. ....... | 52/223.13 |
| 5,474,335 A | | 12/1995 | Sorkin | |
| 5,560,163 A | * | 10/1996 | Carlton ....................... | 285/903 |
| 5,775,849 A | | 7/1998 | Sorkin | |
| D400,670 S | | 11/1998 | Sorkin | |
| 5,947,533 A | * | 9/1999 | Fisher et al. ................ | 285/364 |
| 5,954,373 A | | 9/1999 | Sorkin | |
| 6,389,764 B1 | * | 5/2002 | Stubler et al. ........... | 52/223.13 |

* cited by examiner

*Primary Examiner*—David Bochna
(74) *Attorney, Agent, or Firm*—Harrison & Egbert

(57) ABSTRACT

A coupler member for use with precast concrete segmental structures having a first duct, a first coupler member extending over and around an exterior surface of the first duct and having a seat opening adjacent an end of the first duct, a second duct, a second coupler member extending over and around an exterior surface of the second duct and a seat opening adjacent to an end of the second duct, and gasket received in the seats of the first and second coupler members. An external seal is affixed to an opposite end of the first coupler member and affixed to an exterior surface of the first duct. The seats of the first and second coupler members have slots facing one another. The gasket is received within these slots. The gasket has a tapered outer surface suitable for liquid-tight abutment against an inner surface of one of the slots.

17 Claims, 5 Drawing Sheets

DUCT COUPLER APPARATUS FOR USE WITH PRECAST CONCRETE SEGMENTAL CONSTRUCTION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The present invention relates to the assembly and installation of precast concrete segments used in construction activities, such as bridge and highway construction. More particularly, the present invention relates to couplers for joining the ends of interior ducts of such precast concrete segments in end-to-end liquid-tight relationship.

2. Description of the Prior Art

Precast segmental bridges are known and commonly used throughout the world as a means to forge roadways through mountainous terrain or across rivers or other barriers. Such bridges are typically constructed in accordance with the following sequence: First, a series of upright piers are formed along the bridge span. Thereafter, cantilevered bridge section are built out of each pier by successively mounting the precast segments to previously completed bridge components and post-tensioning the segments thereto. The cantilevered bridge sections are built out from each pier in a symmetrical fashion so that the piers are not subjected to undue bending loads. When the cantilevered sections are complete, the ends thereof are post-tensioned together to form a continuous bridge deck. Typically, two such bridge spans are constructed to accommodate the two directions of travel. These spans are generally side-by-side, but need not be parallel (horizontally or vertically) nor at the same elevation.

FIGS. 1-4 illustrate a form of such precast segmental bridge construction in accordance with the teachings of U.S. Pat. No. 5,231,936, issued on Aug. 3, 1993 to G. Sauvagiot. This form of segmental precast bridge construction is particularly disclosed as used with a rapid transit viaduct system.

Referring to FIG. 1, a rapid transit viaduct section two includes a central load bearing span or body member 4 supported by a pair of upright pier members 6 and 8. Extending laterally from opposite lower side portions of the central body 4 are a pair of lateral platform structures 10 and 12. Each of the platform structures 10 and 12 has a pair of rails 14 mounted thereon for carrying a rapid transit vehicle. In addition, each of the platform sections may be provided with an upright sidewall section 16 as required for safety, noise pollution and other considerations. One or more sets of rails 14 are carried by each of the lateral platform structures depending on the requirements of the transit systems.

The platform structures 10 and 12 each include respective upper platform decks and respective lower support struts 22 and 24. The lower support struts 22 and 24 are mounted as close to the bottom of the central load bearing body 4 as practicable. Deck members 18 and 20 are mounted to the central body 4 at an intermediate portion thereof above the support struts 22 and 24. The support struts angle upwardly from their point of attachment with the load bearing body 4 until they intersect the deck members. As such, the deck members 18 and 20 and support struts 22 and 24 form a box section providing resistance to torsional loading caused by track curvature and differential train loading. This box section may be considered a closed base. The load bearing body 4 bisects the closed base and extends vertically upwardly therefrom to provide span-wise bending resistance. Preferably, the entire duct section 2 is cast as a single reinforced concrete cross-section.

The platform sections 10 and 12 each include lower pier mounts 26 and 28. These are mounted respectively to the bottom of the support structures 22 and 24. The pier mounts 26 and 28 are, in turn, supported, respectively, on the piers 6 and 8 using a plurality of neoprene pads 30, which provide a cushioned support for the structure.

As shown in FIG. 1, the viaduct section 2 forms part of a viaduct system supporting rails 14 for carrying rapid transit vehicles 32 and 34. The viaduct section 2 may be formed as a precast modular segment. The viaduct section 2 is then combined with other viaduct sections to form a precast segmental structure. To facilitate such construction, the load bearing body 4 may be formed with interlock member 36, while the lateral platform structures 10 and 12 may be each formed with interlock members 38.

Referring to FIG. 2, a viaduct system is formed from a plurality of precast sections 2 formed as modular segments and combined as a precast segmental structure extending between sequentially positioned piers (not shown). The sections 2 are placed in longitudinally abutting relationship. To facilitate that construction, the sections are match cast so that the abutting end portions thereof fit one another in an intimate interlocking relationship. Each successive section is therefor cast against a previously cast adjacent section to assure interface continuity.

The connection between adjacent modular sections is further secured by way of the interlock members 36 and 38. On one end of each section 2, the interlock members 36 and 38 are formed as external keys. On the opposite end of each section 2, the interlock members are formed as an internal slot or notch, corresponding to the key members of the adjacent viaduct system. Match casting assures that corresponding keys and slots, as well as the remaining interface surfaces, properly fit one another.

As seen in FIG. 2, the sections 2 are bound together with one or more post-tensioning cables or tendons 40, 42 and 44. The number of cables used will depend on a number of factors such as cable thickness, span length and loading requirements. The tensioning cables are each routed along a predetermined path which varies in vertical or lateral position along the span of the segmental structure.

FIG. 3 illustrates, diagrammatically, the manner in which the post-tensioning cables 40, 42 and 44 extend through the concrete structure of the spans. As can be seen in FIG. 3, the post-tensioning cables are sometimes positioned within the concrete segment themselves, and at other times are positioned externally thereof.

It is important to note that multiple post-tension cables are often used as extending through ducts within the concrete structure. In FIG. 4, it can be seen that the sections 2 are formed with appropriate guide ducts 50 at locations where the post-tensioning cables passed through the structure. The post-tensioning cable identified collectively by reference numeral 52 in FIG. 4, are routed through the guide ducts 50. To facilitate this routing, a continuous flexible conduit 54 is initially inserted through the guide ducts, and the post-tensioning cables 52 are thereafter placed in the conduit. The conduit 54 may advantageously be formed from polyethylene pipe but could also be formed from flexible metallic materials. The post-tensioning cables 52 are tensioned using conventional post-tensioning apparatus and the interior of the conduit 54 is cement grouted along the entire length thereof for corrosion protection.

One form of duct that is commercially available is shown in FIG. 5. The corrugated polymeric duct 56 is of a type presently manufactured by General Technologies, Inc. of Stafford, Tex., licensee of the present inventor. As can be see in FIG. 5, duct 56 has a plurality of corrugations 58 extending radially outwardly from the generally tubular body 60. The duct 56 has ends 62 and 64 through which post-tensioning cables can emerge. In FIG. 5, it can be seen that there are longitudinal channels 66, 68 and 70 extending along the outer surface of the tubular body 60. The longitudinal channels 66, 68 and 70 allow any grout that is introduced into the interior of the duct 56 to flow easily and fully through the interior of the duct 56. The longitudinal channels 66, 68 and 70 also add structural integrity to the length of the duct 56. It is important to realize that the duct 56 can be formed of a suitable length so as to extend fully through one of the segments 2 as used in a precast segmental structure.

Unfortunately, when such ducts, such as duct 56, are used in such precast segmental construction, it is difficult to seal the ends 62 and 64 of each duct to the corresponding duct of an adjacent section of the segmental structure. Conventionally, the segments are joined together in end-to-end relationship through the application of an epoxy material to the matching surfaces of the structure. Under such circumstances, it is very common for the epoxy to flow or to become extruded into the opening at the ends 62 and 64 of the duct when the segments are connected in end-to-end relationship. In other circumstances, a grout is pumped through the interior passageway of the duct 56 so as to offer a seal against the intrusion of air and water into the interior of the duct 56. The grout is pumped through the interior of the ducts. Unfortunately, if there is an incomplete connection between the duct 56 and the duct of an adjoining segment of the segmental structure, then the epoxy will leak out into the interface area between the segments and will not flow fully through the entire duct assembly. Once again, an incomplete grouting of the interior of the duct 56 may occur.

It is important to note that in such precast concrete segmental construction, the concrete will slightly warp when matched with the adjoining section. Even though match casting is employed, the lack of homogeneity in the concrete mixtures used for the adjoining sections can cause a misalignment between matching sections. A great deal of tolerance must maintained when a coupler is developed so that any warping or distortion in the surfaces of the matching segments can be accommodated.

The ability to avoid air and liquid intrusion into the interior of the duct 56 is very important in such multi-strand, precast concrete segmental structures. As can be seen in FIG. 1, since the structure is often used on bridges or elevated structures, the post-tensioning cables can be subject to a great deal of exposure from the elements. For example, if the bridge structure is associated with roads traveled by motor vehicles, then there is often the application of salt onto the highway. This salt, when dissolved in water, can leach through the area between the structure segments into the ducts and deteriorate the post-tensioning cables over time. As the post-tensioning cables become corroded, over time, they can weaken so as to potentially cause the failure of the segmental structure. Past experience with such structures has shown that the primary area of leakage would be through those cracks formed between those matched segments. As such, it is particularly important to provide a coupler for use in association with the polymeric ducts which will effectively prevent any liquid intrusion from entering the area interior of the ducts and adjacent to the post-tensioning cables.

It is an object of the present invention to provide a coupler apparatus which allows for the coupling of multi-tendon ducts in precast segmental concrete structures.

It is another object of the present invention to provide a coupler apparatus which automatically adjusts for any misalignments or warpage in the matching concrete segments.

It is another object of the present invention to provide a coupler apparatus which assures a liquid-tight seal between the coupler and the connected duct.

It is still a further object of the present invention to provide a coupler apparatus which is easy to install, easy to use and easy to manufacture.

It is still a further object of the present invention to provide a coupler apparatus which effectively prevents the intrusion of an epoxy into the interior of the duct during the sealing of one structural segment to another structural segment.

It is a further object of the present invention to provide a symmetrical duct coupler which facilitates the ability to manufacture and install the components thereof.

These and other objects of the present invention will become apparent from a reading of the attached specification and appended claims.

SUMMARY OF THE INVENTION

The present invention is a coupler apparatus for use with precast concrete segments comprising a first duct having an end and an exterior surface, a first coupler member extending over and around the exterior surface of the first duct and having a seat opening adjacent to an end of the first duct, a second duct having an end and an exterior surface, a second coupler member extending over and around the exterior surface of the second duct and having a seat adjacent to the end of the second duct, and a gasket received in the seat of the first coupler member and in the seat of the second coupler member. The gasket serves to prevent liquid from passing between the ends of the coupler members into an interior of either of the first and second ducts. The first duct and the first coupler are embedded in a first concrete segment. The second duct and the second coupler member are embedded in a second concrete segment. The seat of the first coupler member faces the seat of the second coupler member.

An external seal is affixed in generally liquid-tight relationship to an opposite end of the first coupler member and is also affixed to the exterior surface of the first duct. This external seal is formed of a heat shrink material. This external seal is in compressive contact with the exterior surface of the first coupler member and with the exterior surface of the first duct.

An internal seal is interposed in generally liquid-tight relationship between an interior surface of the second coupler member and an exterior surface of the second duct. This internal seal is an annular ring of an elastomeric material positioned so as to allow relative movement between the second coupler member and the second duct while maintaining the liquid-tight relationship therebetween.

The seat of the first coupler member is a generally wide slot with an opening facing the second coupler member. Similarly, the seat of the second coupler member is a generally wide slot with an opening facing the seat of the first coupler member. The gasket is fixedly received in the slot of the second coupler member. The seat of the first coupler member has a back surface in abutment with an end of the first duct. Similarly, the end of the second coupler member has a back surface in abutment with the end of the second duct. The gasket is an elastomeric ring having a cross-sectional thickness greater than a combined depth of the seats of the first and second coupler members. The elastomeric ring has a surface tapering in thickness extending outwardly of the slot of the second coupler member. The portion extending outwardly of the seat of the second coupler has a thickness greater than the depth of the seat of the first coupler member.

In the present invention, the first duct, the second duct, the first coupler member and the second coupler member are each formed of a polymeric material.

DETAILED DESCRIPTION OF THE INVENTION

Figure 6:
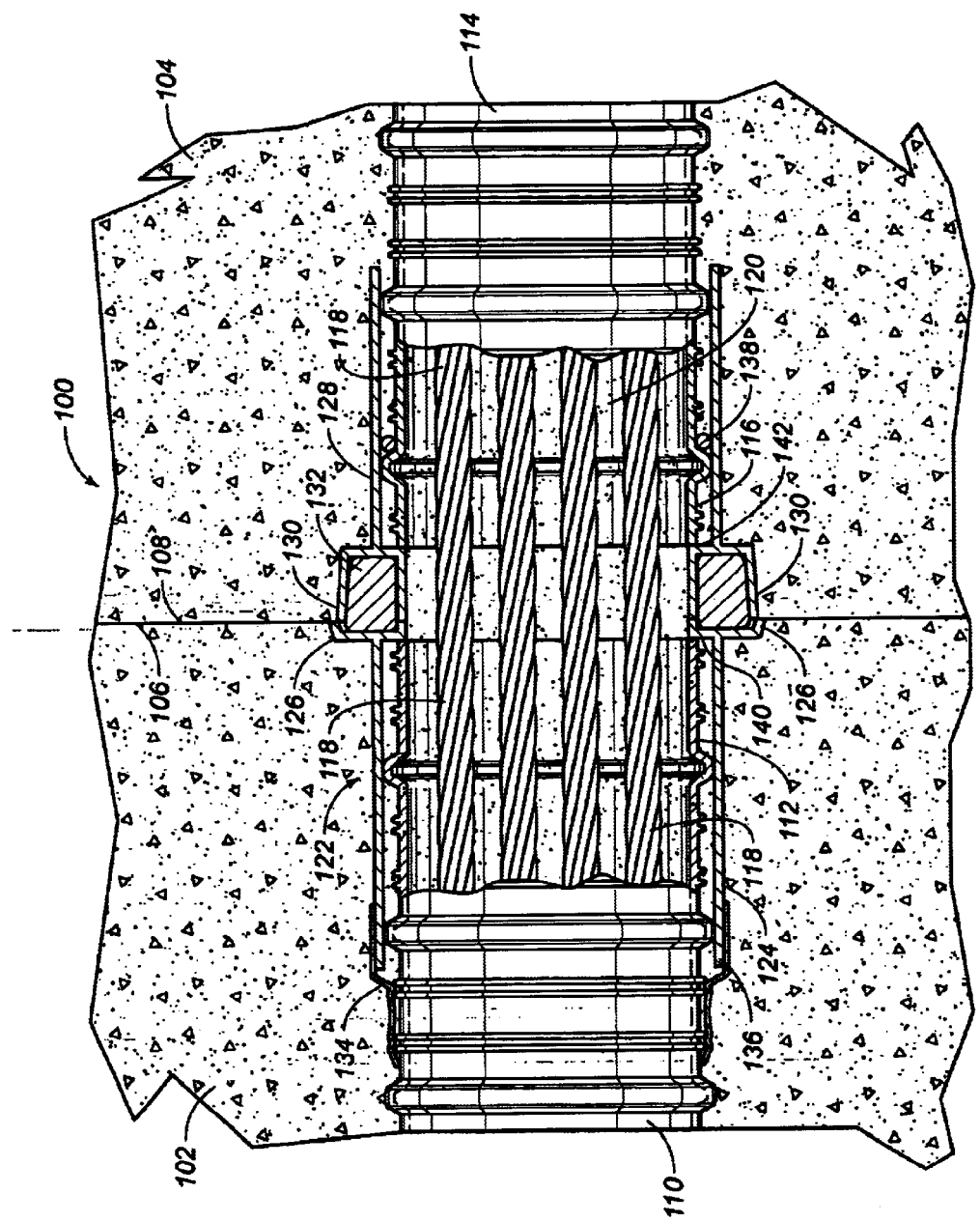
FIG. 6 is a cross-sectional view showing the coupler assembly as used in the precast concrete segmental structure of the present invention.

Referring to FIG. 6, there is shown at 100 the precast concrete segmental structure in accordance with the teachings of the present invention. The structure 100 includes a first concrete segment 102 and a second concrete segment 104. The first concrete segment 102 has an outer surface 106 which is joined in surface-to surface contact with the inner surface 108 of the concrete segment 104. The segments 102 and 104 are formed by match casting, as described hereinbefore.

Figure 1:
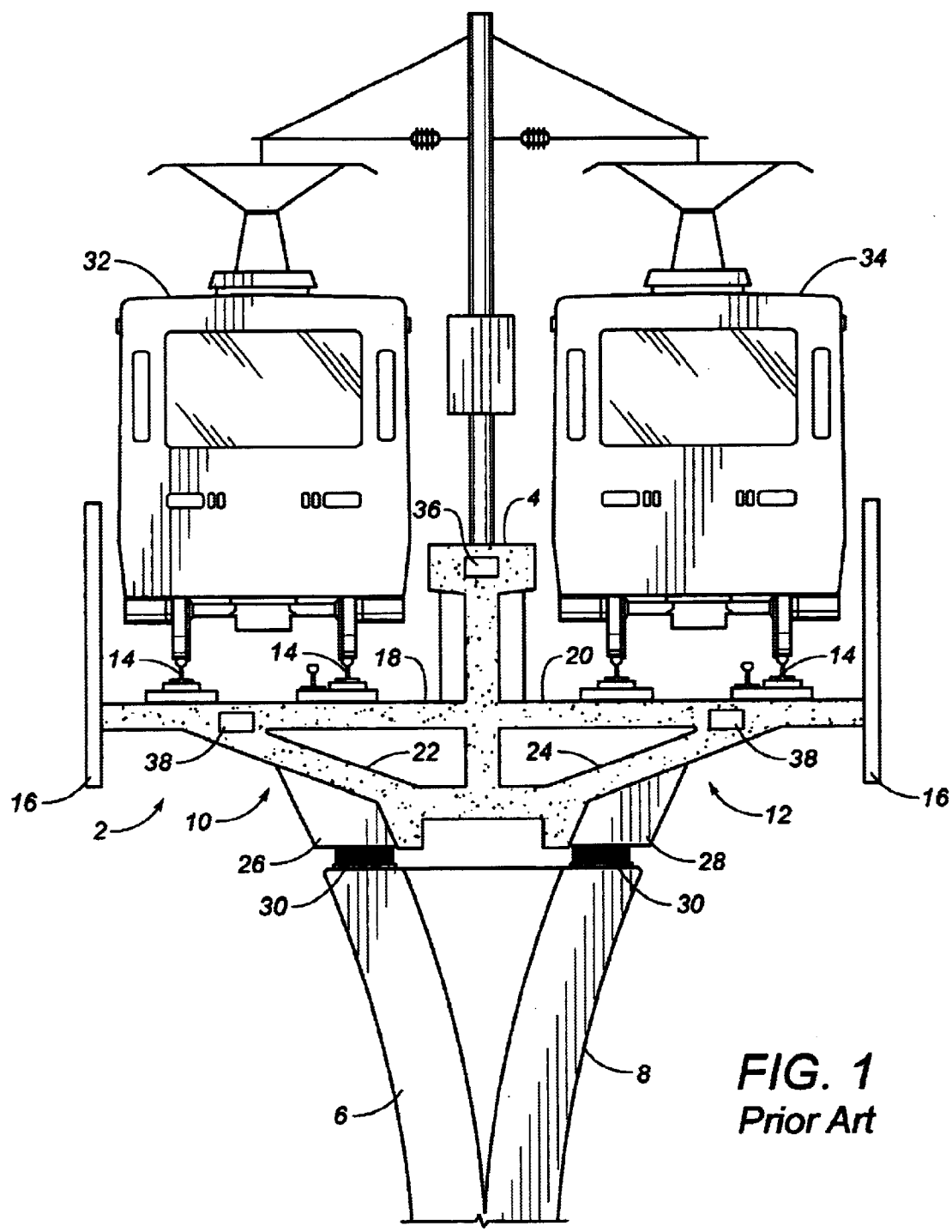
FIG. 1 is a diagrammatic view showing a cross-section of a rapid transit viaduct structure employing a prior art precast segmental structure.
Figure 2:
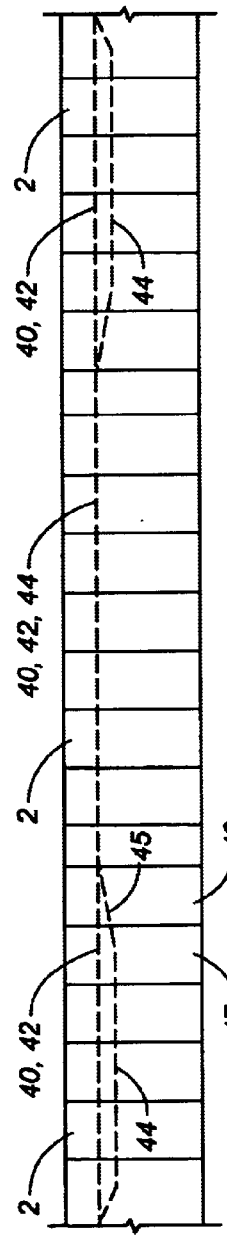
FIG. 2 is a partially diagrammatic view showing a cross-section indicating the assemblage of the concrete segments of the structure of FIG. 1 and showing, in particular, the alignment of the post-tensioning cables.
Figure 3:
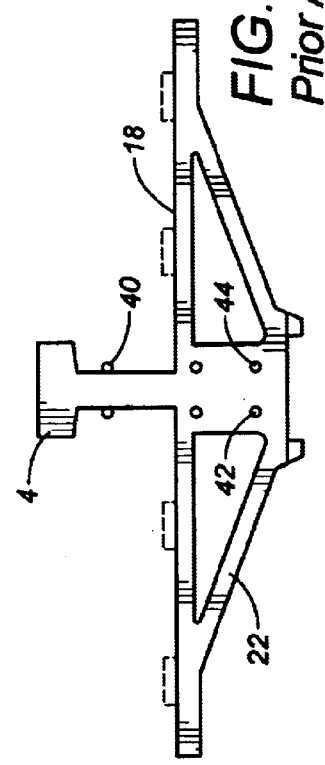
FIG. 3 is an end view of a precast concrete segment, and the associated post-tension cables, of the prior art structure if FIG. 1.
Figure 4:
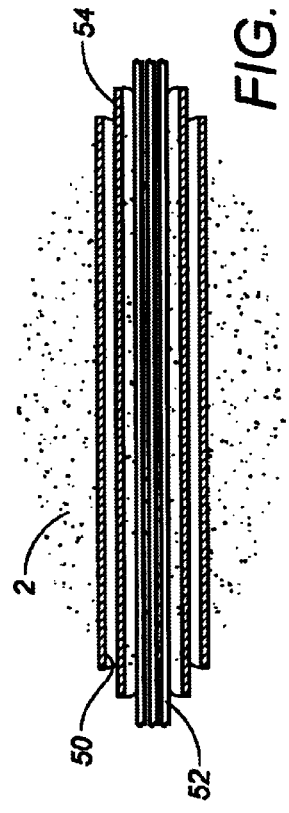
FIG. 4 is a diagrammatic cross-sectional view showing the prior art techniques for the routing of a cable through the duct associated with the concrete segment.
Figure 5:
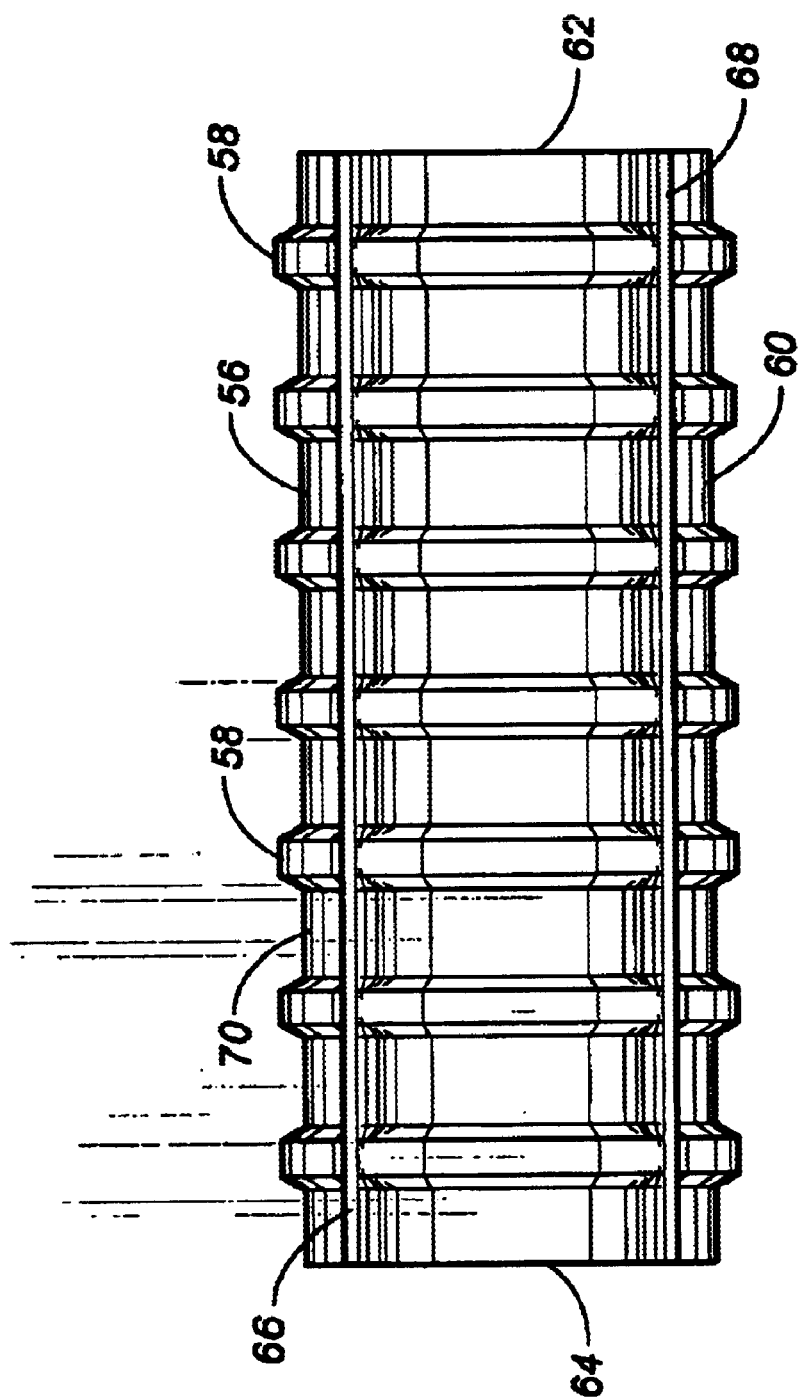
FIG. 5 is a side elevational view of a prior art multi-cable duct as used in the present invention.

Importantly, a first duct 110 is embedded in the first concrete structure 102. Duct 110 has a construction similar to that shown in FIG. 5, or similar to other multi-cable ducts. The first duct 110 has an end 112 generally adjacent to the exterior surface 106 of the concrete segment 102. Similarly, a second duct 114 is embedded in the second concrete segment 104. The second duct 114 has a configuration similar to that of duct 110. Duct 114 has an end 116 generally adjacent to the inner surface 108 of concrete segment 104. Each of the ducts 110 and 114 are embedded in the respective concrete segments 102 and 104 so as to be generally longitudinally aligned. The duct 110 has an interior passageway which will be axially aligned with the interior passageway of duct 114.

As can be see in FIG. 6, a plurality of tendons 118 extend longitudinally through the interior passageways of the ducts 110 and 114. In FIG. 6, these tendons 118 are properly post-tensioned in a conventional manner. A grouting material 120 fills the interior passageways 110 and 114 to further cement and seal the interior of the ducts 110 and 114 around the tendons 118. The grouting material, in combination with the polymeric material of the ducts 110 and 114, serves to avoid the adverse effects of liquid intrusion into the tendons 118. The present invention utilizes a unique coupler apparatus 122 which further assures the avoidance of liquid intrusion through the space between the exterior surface 106 of concrete segment 102 and the inner surface 108 of concrete segment 104. A first coupler member 124 extends over and around the exterior surface of the first duct 110. The first coupler member 124 has a seat 126 at one end thereof. The seat 126 opens at the exterior surface 106 of concrete segment 102. Similarly, the seat 126 of the coupler member 124 is generally forward of, but adjacent to, the end 112 of first duct 110. A second coupler member 128 extends over and around the exterior surface of the second duct 114. The second coupler member 128 has a seat 130 opening at the inner surface 108 of concrete segment 104. End 130 is slightly forward of the end 116 of the duct 114. A gasket 132 is received in the seats 126 and 130 of the respective coupler members 124 and 128. The gasket 132 is particularly designed to prevent liquid from passing between the ends of the respective coupler members 124 and 128 into the interior of the ducts 110 and 114. The coupler members 124 and 128 have an identical configuration to each other. This serves to minimize the manufacturing requirements since only a single mold is required for each of the coupler members. Also, installation is easy since unskilled workers can install the first and second coupler members without regard to the configuration of a particular coupler member.

An external seal 134 is affixed in generally liquid-tight relationship to an opposite end 136 of the first coupler member 124 and is also affixed to an exterior surface of the first duct 110. In particular the external seal 134 is formed of an elastomeric sleeve or an annular heat shrink material. The external seal 134 will be in compressive liquid-tight contact with the exterior surface of the first coupler member 124 and with the exterior surface of the duct 110. Prior to embedding the coupler member 124 into the concrete associated with the concrete segment 102, the coupler member 124 can be affixed in liquid-tight relationship by applying heat to the exterior surface of the external seal 134. As a result, the heat-shrink material of the external seal 134 will tightly engage the surfaces of the coupler member 124 and also the exterior surfaces of the duct 110. As a result, the exterior surface 134 will prevent liquid intrusion through the opposite end 136 of the coupler member 124.

An internal seal 138 in interposed in generally liquid-tight relationship between the interior surface of the second coupler member 128 and the exterior surface of the second duct 114. This internal seal 138 is a generally annular ring formed of an elastomeric material. The internal seal 138 is positioned to allow relative movement between the second coupler member 128 and the second duct 114 while maintaining the liquid-tight relationship between the coupler member 128 and the duct 114. The ability to allow relative movement between the coupler member 128 and the duct 114 is important because of the "match casting" used for the formation of the second concrete segment 104. It can also be adapt to any expansion or contraction of the concrete segments. If there is any warping or inconsistent relationship between the surfaces 106 and 108, the second coupler member 128 will be able to relatively move with respect to the exterior surfaces of the duct 114 to adjust for such warping or inconsistencies. This can be done without affecting the liquid-tight environment between the coupler member 128 and the duct 114.

In FIG. 6, it can be seen that the seat 126 of the first coupler member 124 has a generally wide slot facing the second coupler member 128. In particular, it is the opening of this wide slot which faces the second coupler member 128. Similarly, the seat 130 has a wide slot which faces the slot of the seat 126. It can be seen that the gasket 132 is fixedly received into the wide slot of the seat 130. The gasket 132 is in liquid-tight abutment against at least one of the surfaces defined by the wide slot of seat 126.

So as to further assure the avoidance of any liquid intrusion, it can be seen that the seat 126 of the first coupler member 124 has a back surface 140 which is in abutment with the end 112 of the first duct 110. Similarly, the second coupler member 128 has a surface 142 which is in abutment with the end 116 of the second duct 114. This relationship further assures the accurate placement of the coupler members in end-to-end relationship and further assures the alignment of the ducts 110 and 114.

As can be seen in FIG. 6, the gasket 132 is an elastomeric ring having a cross-sectional thickness greater than a combined depth of the wide slots of the respective seats 126 and 130 of the coupler members 124 and 128. As a result, the elastomeric ring of the gasket 132 will effectively "fill" the outer portions of the seats. In the event of misalignment or warping, the configuration of the seats causes the elastomeric material of the gasket 132 to "extrude" thereinto so as to establish a tight sealing relationship therewith.

Importantly, the present invention is of relatively low cost. The first duct 110, the second duct 114, the first coupler member 124 and the second coupler member 128 are formed of a polymeric material. Each of these components can be formed in an injection molding process. Similarly, the gasket 132 can be formed of an elastomeric or other resilient material. The material used for the gasket 132 should be suitably hydrophobic so as to resist any liquid intrusion.

Figure 7:
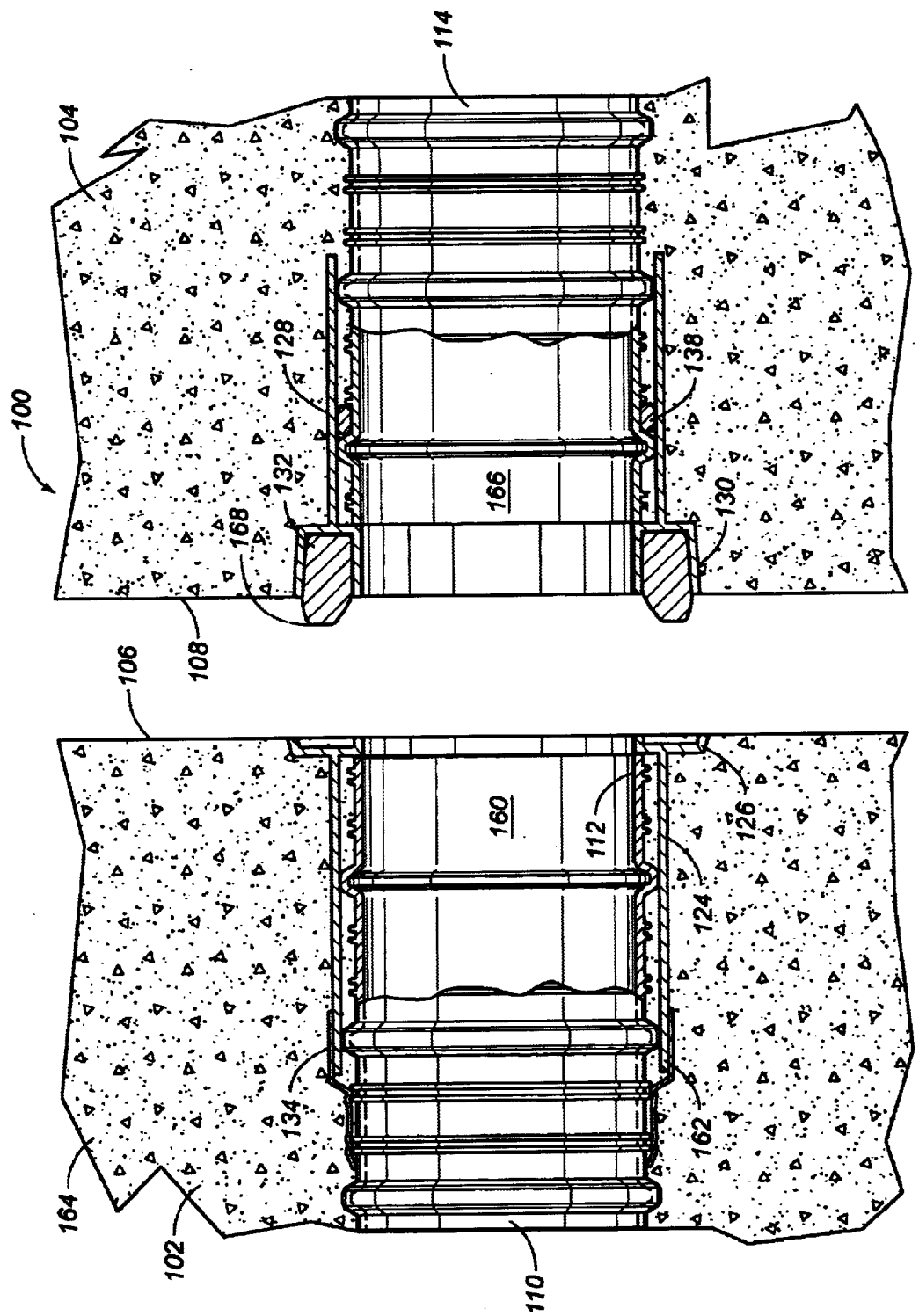
FIG. 7 is a cross-sectional view showing the assembly of the coupler apparatus of the present invention.

FIG. 7 is an illustration of the apparatus 100 of the present invention prior to the installation of the tendons 118 and the installation of the grout 120. In particular, FIG. 7 shows the initial assembly of the components of the present invention.

In the present invention, the first duct 110 is suitably mounted against a metal bulkhead having a flat surface corresponding to the formation of the exterior surface 106 of concrete segment 102. A suitable fixture is provided on the metal bulkhead which will extend into the interior 160 of the first duct 110. Prior to the installation of the first duct 110 onto the bulkhead fixture, the coupler member 124 is placed over the exterior surface of the first duct 110. Similarly, the external seal 134 is placed over the end 162 of the coupler member 124 opposite the seat 126. A suitable heating device, such as a hot air blower, can be applied to the external seal 134 so as to heat shrink the seal 134 upon the exterior surface of the duct 110 and upon the exterior surface of the first coupler member 124. Once the duct 110, along with the attached coupler member 124, is placed upon the bulkhead fixture, the concrete 164 can then be poured into a suitable mold. After solidifying, the metal bulkhead and the attached bulkhead fixture are removed from the surface 106 so as to create a flat surface thereagainst. Upon solidification, the inner surface 108 of the concrete segment 104 will be formed by match casting. In other words, the surface 106 will act as a surface for the formation of surface 108. A suitable mandrel or alignment plug can be placed into the interior passageway 160 of the first duct 110. This alignment plug can extend outwardly beyond the surface 106. The second coupler member 128 can then be applied onto the exterior surface of the second duct 114. The internal seal 138 is interposed between the inner surface of the second coupler member 128 and the exterior surface of the duct 114. The second duct 114 and its associated coupler 128 can then be placed over the alignment plug extending outwardly of the interior passageway 160 of the duct 110 so as to extend into the interior passageway 166 of the second duct 114. Since there is a possibility of slight misalignment during the formation of the second concrete segment 104, the second coupler member 128 is slidable relative to the duct 114 by virtue of the "slidability" of the internal seal 138.

After the concrete solidifies, the surface 108 will be separated from surface 106. Similarly, the seat 130 of the coupler member 128 will be separated from the seat 126 of the coupler 124. The gasket 132 can then be fixedly installed into the wide slot of seat 130 of the second coupler 128. Because of the enlarged cross-sectional area of the annular gasket 132, a portion 168 of the gasket 132 will extend outwardly beyond the end of the second coupler member 128. The portion 168 includes a surface which tapers in thickness extending outwardly of the seat. This portion 168 has a depth which is greater than a depth of the wide slot of the seat 126. The pointed end of the gasket 132 self-aligns within the wide slot of seat 126. As a result, if segment 104 were misaligned with segment 102, the pointed end of the gasket 132 will create a liquid-tight seal with any surface by the seat 126. The remainder of the gasket 132 will further conform with the remaining surfaces of the seat 126 so as to create a liquid-tight seal between the coupler members 124 and 128.

The segment 102 can then be installed as part of the segmental structure. The segment 104 is then transported into position so that the surface 108 will face the surface 106. When the surface 108 is brought into proximity against the surface 106, the relatively pointed side 168 of the gasket 132 will contact a surface in the seat 126 of the first coupler member 124. As the surface 108 is brought further into proximity with surface 106, the gasket 132 will extrude into the wide slot of seat 126 so as to establish an effective liquid-tight seal therewith. After assembling and epoxying of the surfaces 106 and 108 together, tendons can be extended through the interior passageways 160 and 166 of the respective ducts 110 and 114 so as to permanently join the segments 102 and 104 in post-tensioned relationship.

Importantly, as can be seen in FIG. 6, the use of the unique configuration of the gasket 132, along with the shape of the seats 126 and 130, will avoid any intrusion of epoxy into the interior passageways 160 and 166. The gasket 132 will block the extruded epoxy from flowing in an undesired manner into the interior passageways 160 and 166. In a similar manner, the gasket 132 will also prevent any liquid intrusion from passing into these interior passageways. The compressive relationship between the wide slots associated with the coupler members 124 and 128 establishes a strong sealing bond between the coupler members which will be resistive to the elements over an extended period of time. Subsequent to installation, the grout can be effectively pumped through the interior passageways 160 and 166 without any grout accidentally flowing outwardly of the ducts 110 and 114 in the area of the space between the segments 102 and 104. Secondary liquid intrusion is effectively accomplished through the tight sealing relationship of the external seal 134 and the sliding sealing of the internal seal 138.

The foregoing disclosure and description of the invention is illustrative and explanatory thereof. Various changes in the details of the illustrated construction may be made within the without departing from the true spirit of the invention. The present ted by the following claims and their legal equivalents.

I claim:

1. A coupler apparatus for use with concrete segments comprising:
    a first duct having an end and an exterior surface;
    a first coupler member extending over and around said exterior surface of said duct, said first coupler member having a seat opening adjacent said end of said first duct;
    a second duct having an end and an exterior surface;
    a second coupler member extending over and around said exterior surface of said second duct, said second coupler member having a seat opening adjacent said seat of said second duct;
    a gasket means received in said seat of said second coupler member, said gasket means for preventing liquid from passing between said ends of said first and second coupler members into an interior of either of said first and second ducts; and
    an internal seal interposed in a generally liquid-tight relationship between an interior surface of said second coupler member and said exterior surface of said second duct, said internal seal being an annular ring of an elastomeric material positioned so as to allow relative movement between said second coupler member and said second duct while maintaining the liquid-tight relationship therebetween.

2. The coupler apparatus of claim 1, further comprising:
    an external seal affixed in generally liquid-tight relationship to an end of said first coupler member opposite said seat, said external seal affixed to an exterior surface of said first duct.

3. The coupler apparatus of claim 2, said external seal formed of heat shrink material, said external seal being in compressive contact with an exterior surface of said first coupler member and with said exterior surface of said first duct.

4. A coupler apparatus for use with concrete segments comprising:
    a first duct having an end and an exterior surface;
    a first coupler member extending over and around said exterior surface of said duct, said first coupler member having a seat opening adjacent said end of said first duct;
    a second duct having an end and an exterior surface;
    a second coupler member extending over and around said exterior surface of said second duct, said second coupler member having a seat opening adjacent said end of said second duct; and
    a gasket means received in said seat of said second coupler member, said gasket means for preventing liquid from passing between said ends of said first and second coupler members into an interior of either of said first and second ducts, said seat of said first coupler member having a slot facing said second coupler member, said second coupler member having a slot facing said first coupler member, said gasket means fitted in said slot of said second coupler member, said slot of said first coupler member having a depth less than a depth of said slot of said second coupler member, said gasket means being an elastomeric ring having a cross-sectional thickness greater than a depth of either of the slots of said first and second coupler members.

5. The coupler apparatus of claim 4, said seat of said first coupler member having a back surface in abutment with said end of said first duct, said seat of said second coupler member having a back surface in abutment with said end of said second duct.

6. The coupler apparatus of claim 4, said elastomeric ring having a surface tapering in thickness extending outwardly of said slot of said second coupler member.

7. The coupler apparatus of claim 4, said elastomeric ring having a portion extending outwardly of said slot of said second coupler member, said portion having a thickness greater than a depth of said slot of said first coupler member.

8. The coupler apparatus of claim 4, said first coupler member having a different configuration of said second coupler member.

9. A coupler apparatus for use on tendon-receiving ducts of a segmental precast concrete structure comprising:
    a first coupler member having an interior passageway suitable for receiving one of the ducts therein, said first coupler member having an open slot at one end thereof;
    a second coupler member having an interior passageway suitable for receiving another of the ducts therein, said second coupler member having an open slot at one end thereof, said open slot of said second coupler member facing said open slot of said first coupler member;
    a gasket member received in said open slot of said second coupler member, said gasket member having a portion extending outwardly of said slot beyond an end of said second coupler member, said portion of said gasket member receivable in liquid-tight abutment with a surface of said open slot of said first coupler member; and
    an internal seal slidably positioned against an interior surface of said second coupler member.

10. The coupler apparatus of claim 9, said gasket member being an annular member having a cross-sectional thickness greater than a combined depth of said slots of said first and second coupler members.

11. The coupler apparatus of claim 9, further comprising:
    an external seal fixed in liquid-tight relationship to an opposite end of said first coupler member and having a portion extending outwardly beyond said opposite end of said first coupler member.

12. The coupler apparatus of claim 9, said first and second coupler members having different configurations.

13. An apparatus comprising:
    a first concrete segment having an outer surface;
    a first duct embedded in said first concrete segment and extending therethrough, said first duct having an end adjacent to said outer surface of said first concrete segment;
    a first coupler member embedded in said first concrete segment and extending over the first duct, said first coupler member having a seat opening at said outer surface of said first concrete segment;
    a second concrete segment having an inner surface;
    a second duct embedded in said second concrete segment and extending therethrough, said second duct having an end adjacent said inner surface of said second concrete segment;

a second coupler member embedded in said second concrete segment and extending over said second duct, said second coupler member having an seat at said inner surface of said concrete segment;

a gasket fixedly received in said seat of said second coupler member and in liquid-tight abutment with a surface of said seat of said first coupler member, said seat of said first coupler member having back surface in abutment with said end of said first duct, said seat of said second coupler member having a back surface in abutment with said end of said second duct; and an internal seal interposed in generally liquid-tight relationship between an interior surface of said second coupler member and against an exterior surface of said second duct, said internal seal allowing relative movement between said second coupler member and said second duct while maintaining the liquid-tight relationship therebetween.

14. The apparatus of claim 13, further comprising:
an external seal affixed in generally liquid-tight relationship to an opposite end of said first coupler member and affixed to an exterior surface of said first duct.

15. The apparatus of claim 13, said gasket being an elastomeric ring having a cross-sectional thickness greater than a combined depth of said seats of said first and second coupler members.

16. The apparatus of claim 13, further comprising:
a plurality of tendons extending through an interior of said first and second ducts, said gasket positioned so as to prevent liquid from passing between said first and second coupler members into said interior of said first and second ducts.

17. The apparatus of claim 16, further comprising:
a grout material filling said interior of said first and second ducts around said plurality of tendons therein.

* * * * *